No. 689,684.  
P. MUELLER.  
SWEAT JOINT.  
(Application filed Aug. 21, 1901.)  
(No Model.)

Patented Dec. 24, 1901.

Witnesses.  
Nora Graham  
Ira C. Graham.

Inventor.  
Philip Mueller.  
by L. P. Graham  
his attorney.

United States Patent Office.

PHILIP MUELLER, OF DECATUR, ILLINOIS, ASSIGNOR TO H. MUELLER MANUFACTURING CO., OF DECATUR, ILLINOIS, A CORPORATION OF ILLINOIS.

SWEAT-JOINT.

SPECIFICATION forming part of Letters Patent No. 689,684, dated December 24, 1901.

Application filed August 21, 1901. Serial No. 72,804. (No model.)

*To all whom it may concern:*

Be it known that I, PHILIP MUELLER, of the city of Decatur, county of Macon, and State of Illinois, have invented a certain Improved Sweat-Joint, of which the following is a specification.

This invention provides superior means for soldering soft-metal pipes onto hard metal. It is exemplified in the structure hereinafter described, and it is defined in the appended claims.

Figure 1:
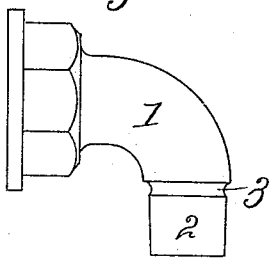
Figure 2:
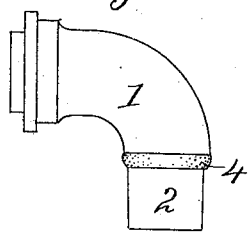

In the drawings forming part of this specification, Figure 1 represents a meter-coupling constructed in accordance with my invention. Fig. 2 represents the coupling after it has been dipped in solder preparatory to making a sweat-joint; and Fig. 3 represents the sweat-joint completed, the lead pipe being shown in section.

The meter-coupling 1 is representative of the many forms the hard-metal member of the sweat-joint may take, and apart from the extension that receives the solder it has nothing to do with my invention. The extension 2 is slightly smaller in diameter than the body of the coupling from which it extends, and an annular groove 3 is formed at the conjunction of the extension with the body.

When the extension is dipped into the solder and withdrawn therefrom, it retains a film of solder around its circumference, and in the groove 3 a body of solder is held. The extended surface of the groove is concentrated on a comparatively narrow strip of solder. The ledge formed by the lower edge of the groove tends to hold the solder mechanically, and between the mechanical support and the concentration of the adhesive surface a considerable body of solder is sustained in the groove. The cohesive properties of solder are rather strong, and so the body of solder retained by the groove acquires a slightly-convex form crosswise of the groove, as shown at 4 in Fig. 2.

Figure 3:
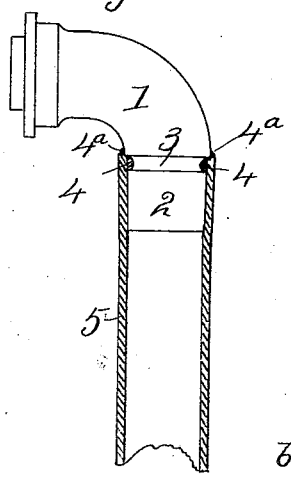

When the lead pipe 5 is forced onto the hard-metal extension 2, its end encounters the projecting ring of solder and carries a part of the solder upward to the position shown at $4^a$ in Fig. 3. The lead pipe crosses the groove of the hard-metal member and then stops, and the result is that in the groove and on the end of the lead pipe above the groove there is enough solder to insure a firm sweat-joint.

The body 1 of the hard-metal member is but slightly larger in diameter than extension 2, thus economizing in the use of metal. The groove is made in the rather thin extension, and when the joint is completed the solder restores the strength and stability that was temporarily affected by the forming of the groove.

I claim—

1. A hard-metal member for a sweat-joint having a solder-receiving extension smaller in diameter than the body of the member, such extension being annularly grooved at its conjunction with the body.

2. In a sweat-joint, the combination of a hard-metal member having a solder-receiving extension annularly grooved at its inner termination, solder in the annular groove and a soft-metal pipe fitting onto the extension and embracing the groove thereof.

3. In a sweat-joint, the combination of a hard-metal member having a solder-receiving extension smaller in diameter than the body, such extension being grooved annularly at its conjunction with the body, solder in the annular groove and a soft-metal pipe fitting onto the extension and embracing the groove.

In testimony whereof I sign my name in the presence of two subscribing witnesses.

PHILIP MUELLER.

Witnesses:
EARL VENTERS,
HARRY B. PAYNE.